United States Patent [19]

Bickford et al.

[11] Patent Number: 4,848,397
[45] Date of Patent: Jul. 18, 1989

[54] HIGH TEMPERATURE SAFETY RELIEF SYSTEM

[75] Inventors: Cleo M. Bickford, Cypress; Walter W. Powell, Sugar Land; Larry A. Sample, Houston, all of Tex.

[73] Assignee: Keystone International, Inc., Houston, Tex.

[21] Appl. No.: 209,194

[22] Filed: Jun. 20, 1988

[51] Int. Cl.$^4$ .................................. F16K 31/124
[52] U.S. Cl. ............................. 137/509; 137/489; 137/492.5; 251/50
[58] Field of Search ............. 137/489, 492, 492.5, 137/509; 251/50

[56] References Cited

U.S. PATENT DOCUMENTS

| | | | |
|---|---|---|---|
| 2,737,974 | 3/1956 | Renick | 137/489 |
| 3,304,951 | 2/1967 | Farris . | |
| 3,376,893 | 4/1968 | McCombs . | |
| 3,589,390 | 6/1971 | Frantz . | |
| 3,664,362 | 5/1972 | Weise . | |
| 3,800,822 | 4/1974 | Baker . | |
| 4,172,466 | 10/1979 | Pattarini | 137/489 X |
| 4,355,657 | 10/1982 | Reip . | |
| 4,390,041 | 6/1983 | Reip . | |
| 4,425,938 | 1/1984 | Papa et al. . | |
| 4,442,680 | 4/1984 | Barbier et al. . | |
| 4,609,008 | 9/1986 | Anderson, Jr. et al. . | |
| 4,682,495 | 7/1987 | McNeely . | |
| 4,693,270 | 9/1987 | Yaindl . | |

FOREIGN PATENT DOCUMENTS 58-35055  3/1983  Japan .

Primary Examiner—Alan Cohan
Attorney, Agent, or Firm—Dodge, Bush & Moseley

[57] ABSTRACT

A high temperature safety relief system for a pressure vessel (10) including a pilot controlled main relief valve (16) and an associated non-flowing pilot valve (34) with high temperature metal or metal like seals for temperatures as high as around 1,000° F. provided for both the main relief valve (16) and pilot valve (34). The main valve body (26) has a main body chamber (48) in fluid communication with the inlet flow passage (45) when the reciprocal piston valve member (88) is in seated closed position. The movement of the piston valve member (88) is cushioned during movement to open position and during movement to closed position. The non-flowing pilot valve (34) has an elongate internal housing (204) receiving the inlet line (36) along its longitudinal axis and the housing (204) is mounted for external rotational adjustment to control the blowdown pressure.

13 Claims, 5 Drawing Sheets

HIGH TEMPERATURE SAFETY RELIEF SYSTEM

BACKGROUND OF THE INVENTION

This invention relates to a safety relief system for a pilot operated relief valve in a vent or main flow line, and more particularly to such a system having a main relief valve and associated pilot valve particularly adapted for use at temperatures over around 350° F. and as high as 1200° F.

Heretofore, safety relief systems such as shown in U.S. Pat. No. 4,425,938, dated Jan. 17, 1984 have been provided in which a main safety relief valve has been mounted over a pressure vessel, such as a tank, with a main valve member having a dome in fluid communication with an associated pilot valve which senses upstream fluid pressures in the tank or flow line for controlling the movement of the main valve member. The main valve member moves to an open position upon the reaching of a predetermined high fluid pressure to relieve or reduce the fluid pressure within the pressure vessel to a predetermined low level.

Further, so-called no-flow or non-flowing pilot valves have been utilized heretofore in combination with main relief valves for controlling the opening and closing of the main valve member. A non-flowing pilot valve does not have a continuous fluid flow during its normal operating or on position when the main valve member is in a static condition. The elimination of a continuous fluid flow through the pilot valve removes many of the problems encountered in pilot valves having a continuous fluid flow such as, for example, the clogging of orifices or ports with entrained foreign matter in the flowing fluid, or icing resulting from wet gas applications. A non-flowing pilot valve normally includes an intermediate fluid chamber between the inlet fluid chamber and the outlet fluid chamber so that simultaneous fluid flow is not provided through the inlet and outlet fluid chambers. However, non-flowing pilot valves in such systems heretofore have normally utilized elastomeric seals which are adapted for use at relatively low temperatures below around 350° F. as elastomeric seals tend to deteriorate at temperatures over around 350° F.–400° F.

Normally, a safety relief valve mounted over a tank, for example, has a body chamber with a main valve member mounted therein for reciprocal movement with its inner end surface exposed to fluid pressure from the tank through an inlet passage. Upon the reaching of a predetermined high pressure in the tank, the reciprocal valve member such as a piston moves outwardly or vertically upwardly to an open position to relieve or reduce the fluid pressure in the tank to a predetermined low level by fluid flow through the main relief valve. Thus, in closed position, the body chamber of the main relief valve is exposed to outlet fluid pressure which may be atmospheric.

A dome chamber is normally provided over the main valve member which is in fluid communication with the intermediate chamber of the associated pilot valve, and the fluid pressure in the dome chamber is generally the same as the inlet fluid pressure. Thus, the main valve member is responsive to fluid inlet pressure which is the pressure of the pressure vessel. In order that the dome pressure remains generally the same as the inlet fluid pressure, it is necessary that a fluid tight seal be provided for the reciprocal valve member so that leakage does not occur past the reciprocal valve member from the dome chamber to the body chamber to reduce the fluid pressure in the dome pressure. Normally, an elastomeric seal is provided between the main valve member and the adjacent body member to provide such a fluid tight seal, but elastomeric seals can not be subjected to high temperatures above around 400° F. without substantial deterioration and associated leakage, particularly at temperatures above 600° F.

SUMMARY OF THE INVENTION

The present invention is related to a safety relief system for a pilot operated relief valve particularly adapted for use at high temperatures over around 350° F. Since elastomeric seals tend to deteriorate, particularly at temperatures around 500° F. or higher, it is desirable that metal or metal-to-metal seals be provided in both the main relief valve and the associated pilot valve for such high temperatures.

The main relief valve has a main reciprocal valve member comprising a piston mounted for reciprocal movement along a longitudinal axis between a closed seated position in which fluid flow from an associated pressure vessel is blocked, and an open unseated position in which fluid flow from the pressure vessel is permitted. The main valve member or piston has a dome or fluid chamber over one end thereof and fluid pressure communicated through the pilot valve to the dome chamber maintains the main valve member in a seated closed position until a predetermined inlet fluid pressure is reached. The pilot valve has an intermediate fluid chamber between the inlet fluid chamber and the outlet fluid chamber, and the intermediate fluid chamber is in direct fluid communication with the dome chamber for controlling the movement of the main valve member. Increased fluid pressure in the inlet fluid pressure above a predetermined level results in a decreased fluid pressure in the intermediate fluid chamber of the pilot valve and in the dome chamber of the main valve member thereby to permit opening of the main relief valve.

Another feature is directed to the main relief valve having its body chamber normally exposed to inlet fluid pressure from the pressure vessel as opposed to outlet fluid pressures common heretofore. As a result, possible fluid leakage from the dome chamber of the main relief valve past the metal seals on the piston and to the body chamber does not adversely effect the operation of the safety system including the pilot valve controlling such operation. The intermediate fluid chamber of the pilot valve is in fluid communication with the dome chamber and possible leakage from the dome chamber to the valve body chamber would not adversely affect the operation of the pilot valve. This is of particular importance with high temperature valves where metal or metal like seals are utilized as it is oftentimes difficult to obtain fluid tight sealing with metal seals.

It is an object of the present invention to provide a high temperature safety relief system for temperatures over around 350° F. including a high temperature pilot operated main valve in combination with a high temperature non-flowing pilot valve.

It is a further object of this invention to provide in such a high temperature safety relief system a main relief valve having a body chamber in fluid communication normally with fluid inlet pressure from a pressure vessel, and a reciprocal piston type valve member in the body chamber having its inner end surface in seated position exposed to outlet fluid pressure whereby possible fluid leakage between the dome chamber and the body chamber does not adversely affect the operation of the system.

An additional object of this invention is to provide such a system utilizing a pilot valve having an easily adjustable internal housing for blowdown control with a fluid inlet line being received within the outer end of the internal housing which is rotated for obtaining the adjustable blowdown control.

A further object of this invention is to provide an improved high temperature main relief valve comprising a reciprocal piston valve member which is cushioned during its movement to an open position from a seated closed position, and cushioned during return to a closed seated position from open position thereby to minimize any slamming or impact action exerted by the valve member against the valve body.

A further object includes the provision of an improved high temperature pilot valve particularly adapted for use in a high temperature safety relief system and having an elongate internal housing providing an adjustable blowdown upon rotation thereof with the fluid inlet line fitting axially within the internal housing thereby to facilitate sealing of the inlet line while permitting adjustment for blowdown and control.

Other objects, features, and advantages of this invention will become more apparent after referring to the following specifications and drawings.

DESCRIPTION OF THE INVENTION

Figure 1:
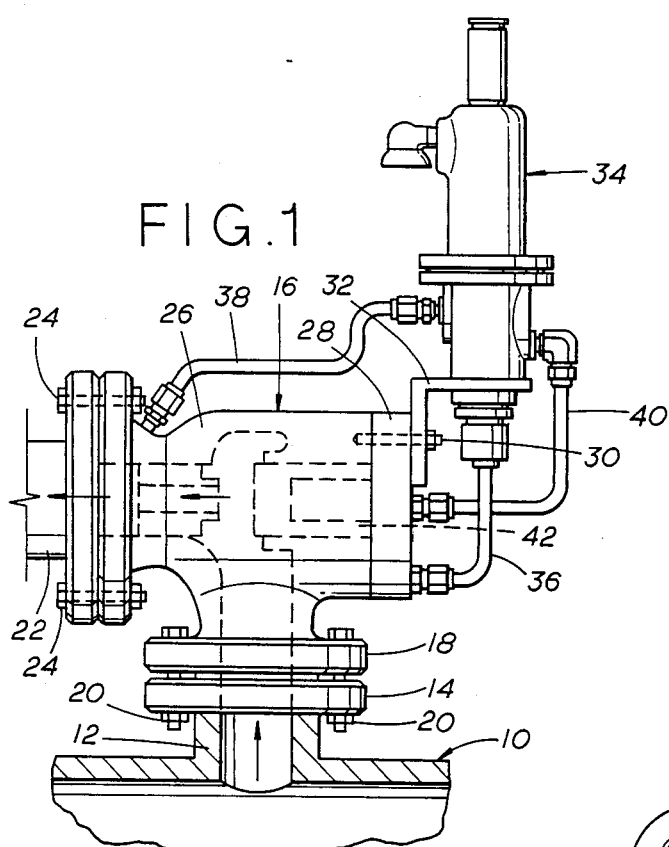
FIG. 1 is a schematic of the high temperature safety relief system comprising the present invention showing a main relief valve and associated pilot valve positioned on a pressure vessel.

Referring now to the drawings for a better understanding of this invention, and more particularly to FIG. 1 in which the high temperature safety system comprising the present invention is illustrated schematically, a pressure vessel or tank shown generally at 10 has an outlet 12 extending therefrom with a flange 14 thereon. A main relief valve is indicated generally at 16 and has a lower flange 18 connected by suitable nut and bolt combinations 20 to flange 14. An outlet line 22 is connected to main relief valve 16 by aligned flanges connected by nut and bolt combinations 24.

Main relief valve 16 has a main body 26 with a cap or cover 28 secured thereon by threaded bolts 30. A support angle indicated generally at 32 is secured to cover 28 by bolts 30 and a pilot valve generally indicated at 34 is mounted on support angle 32. An inlet line 36 extends from main valve 16 to pilot valve 34, and an outlet line 38 extends from pilot valve 34 to the downstream outlet side of body 26. A control fluid line 40 extends from pilot valve 34 to the dome or dome chamber 42 of main valve 16. The high temperature pressure relief system comprising the present invention is particularly adapted for use at temperatures over around 350° F. and may be utilized with steam, liquid, or vapor with various types of pressure vessels or fluid flow lines extending to main relief valve 16.

Referring particularly now to FIGS. 2–5, body 26 of main relief valve 16 has an inlet 44 defining inlet flow passage 45 and an outlet 46 defining outlet flow passage 47 with a main valve chamber indicated at 48 in direct fluid communication at all times with inlet flow passage 45. Outlet 46 has an inwardly extending annular flange 50 defining an abutting surface or shoulder 52 facing valve chamber 48. A fixed valve seat member indicated generally at 54 has a nozzle 56 having a tapered inlet end 58 which defines an annular metal seat 59 having a diameter D. An outer annular flange 60 abuts annular shoulder 52 on flange 50. Aligned openings in flanges 50 and 60 receive threaded bolts 62 for securing seat member 54 within outlet flow passage 47. A suitable high temperature seal 64 such as a metal seal, or a metal-like seal such as a graphite seal sold under the trademark "Grafoil", a registered trademark of Union Carbide Corporation, is provided between seat member 60 and body 26.

Figure 3:
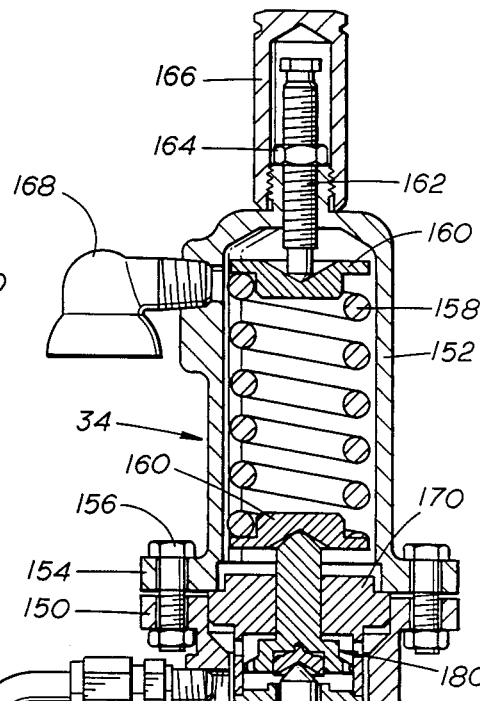
FIG. 3 is a longitudinal sectional view similar to FIG. 2 but showing the main relief valve opened under a predetermined high fluid pressure in the pressure vessel for relieving the pressure vessel.
Figure 3:
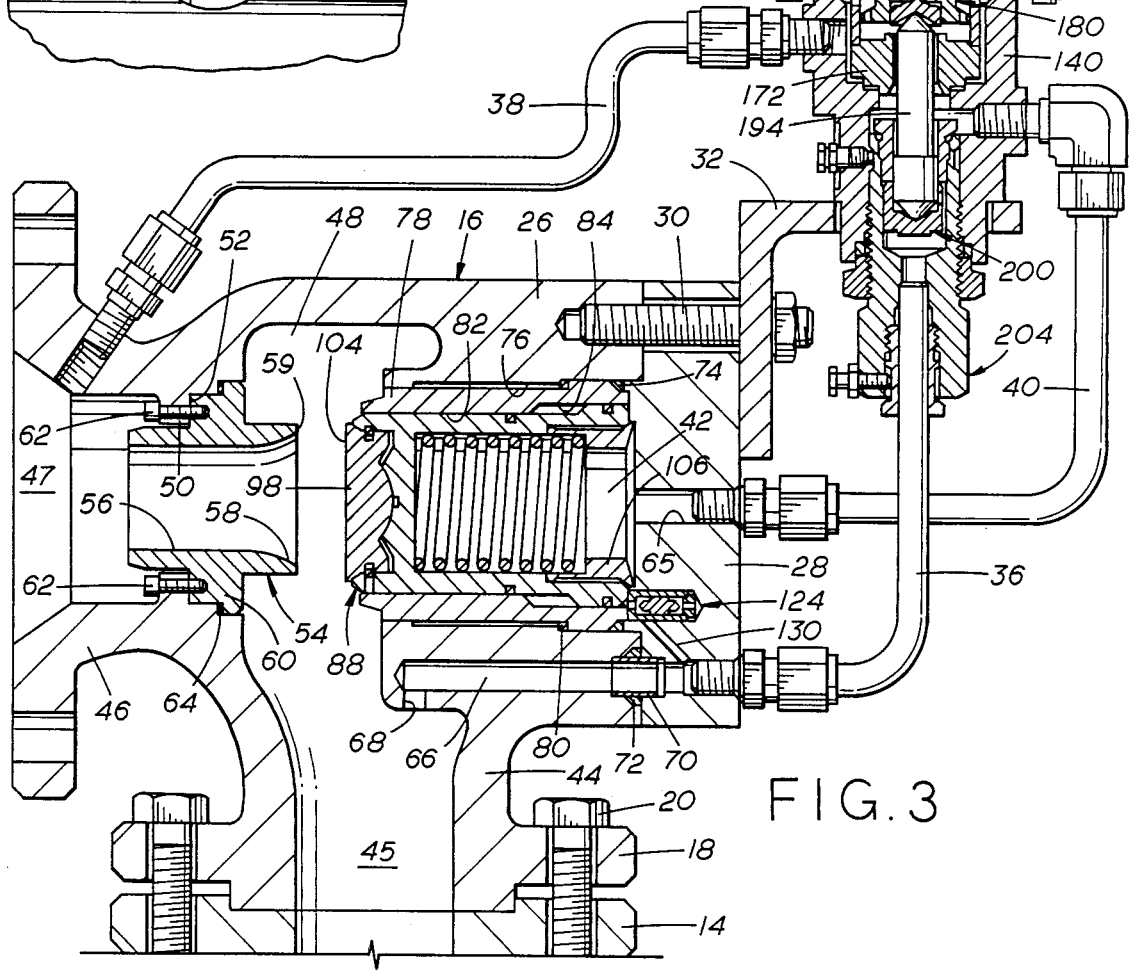
Figure 2:
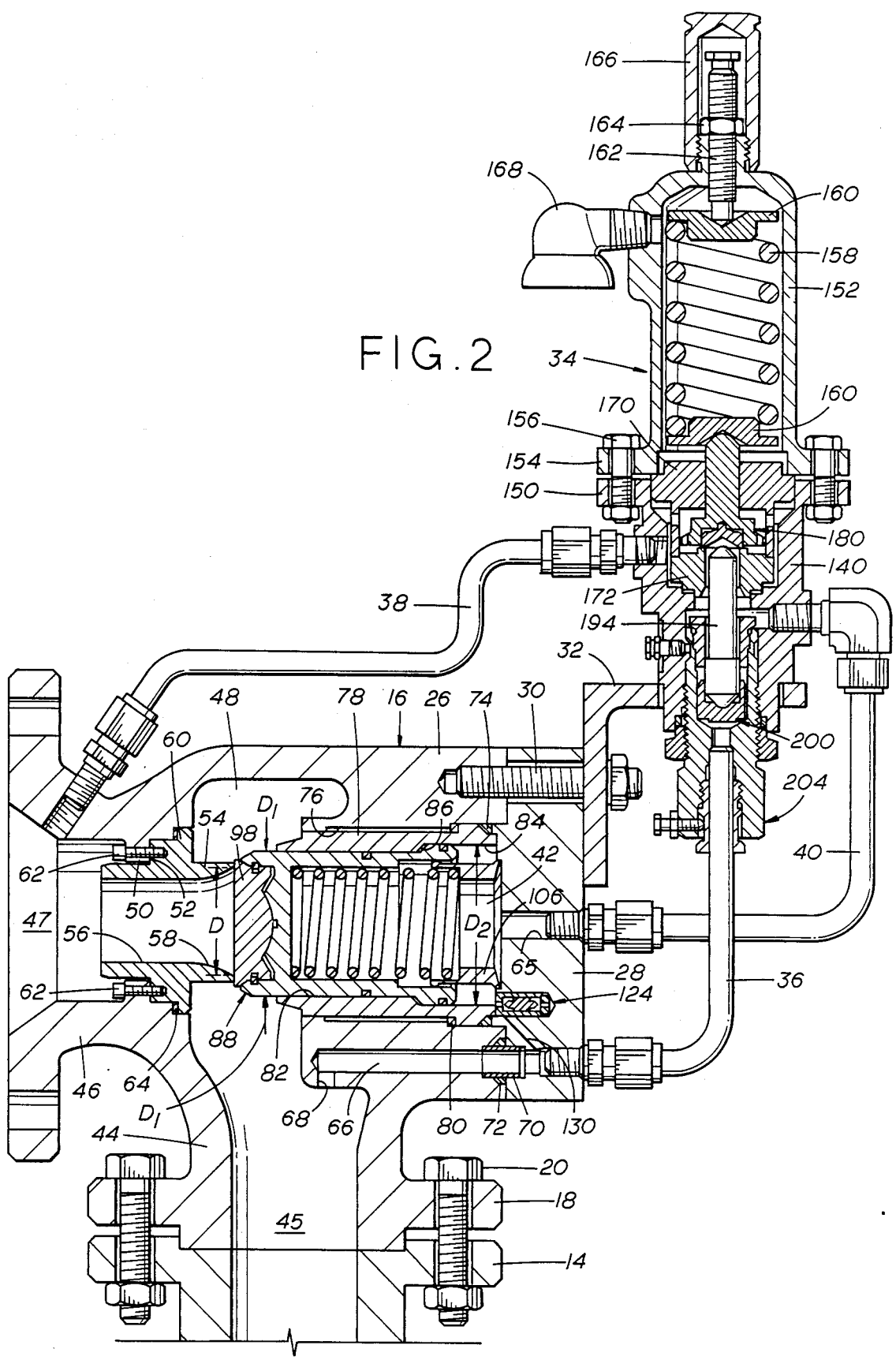
FIG. 2 is a longitudinal sectional view of the main relief valve and associated pilot valve shown in a normal operating condition with the main relief valve in seated closed position blocking flow from a pressure vessel.

Cap or cover 28 on valve body 26 has a port 65 between line 40 and dome chamber 42. Cover 28 permits entry or access to valve chamber 48 upon removal thereof by removal of bolts 30. Body 26 has a fluid inlet port 66 as shown in FIGS. 2 and 3 which also extends through cover 28 and is in fluid communication with inlet line 36 to pilot valve 34. An opening 68 is provided between inlet flow passage 45 and inlet port 66. A tubular section 70 is positioned about port 66 between cover 28 and body 26 with a graphite seal 72 about tubular section 70. An inner graphite seal shown at 74 also provides sealing between cover 28 and body 26.

Valve body 26 has a bore 76 therein adjacent cover 28 in communication with valve chamber 48. A cylindrical sleeve or cylinder 78 is mounted therein and held in position by cover 28 and seal 74. An annular seal 80 also seals between bore 76 and sleeve 78. Cylindrical sleeve 78 defines a main bore portion 82 having a diameter D1 and an enlarged bore portion 84 having an enlarged diameter D2. A connecting bore portion shown at 86 connects bore portions 82 and 84. A hollow piston generally indicated at 88 is mounted for reciprocal movement within sleeve 78. Metal piston rings 90 and 92 are mounted in annular grooves about piston 88 and ride in sealing relation along respective bore portions 82 and 84 of fixed sleeve 78. The inner end of piston 88 has a recess indicated generally at 94 therein and defining a generally hemispherical center portion 96. A disc seat indicated generally at 98 is mounted within recess 94 and has a central convex spherical portion shown at 100 in bearing contact with the surface formed by center portion 96. A retaining ring 102 is loosely mounted in aligned annular grooves in piston 88 and seat disc 98. Disc 98 has a limited movement within recess 94 so that annular seat 104 defined by seat disc 98 seats in a metal-to-metal sealing contact with adjacent annular seat 59 on seat member 54. The surface area of disc 98 defined by diameter D is the area exposed to outlet fluid pressure in the closed seated position of piston 88.

Dome chamber 42 which is formed by hollow piston 88 has an inner cushioning sleeve generally indicated at 106 mounted therein and defines a spring seat 108. A spring 110 is biased between the spring seat 108 of inner cushioning sleeve 106 and a spring seat 111 formed at the inner end of hollow piston 88. Spring 110 urges inner cushion member 106 into engagement with the inner surface 112 of cover 28 as shown particularly in FIGS. 4 and 5. Also, piston 88 is urged into sealing contact with fixed valve seat 59 by spring 110.

Figure 4:
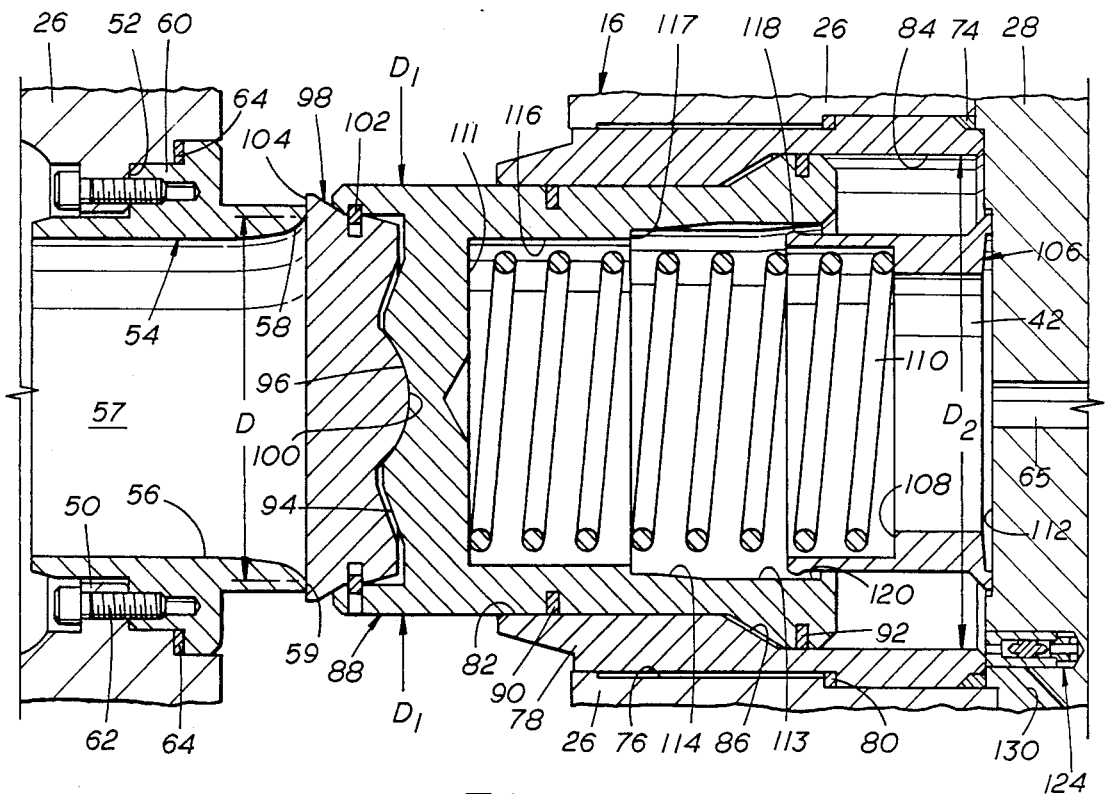
FIG. 4 is an enlarged fragment of FIG. 2 showing the main relief valve in normal seated position.
Figure 5:
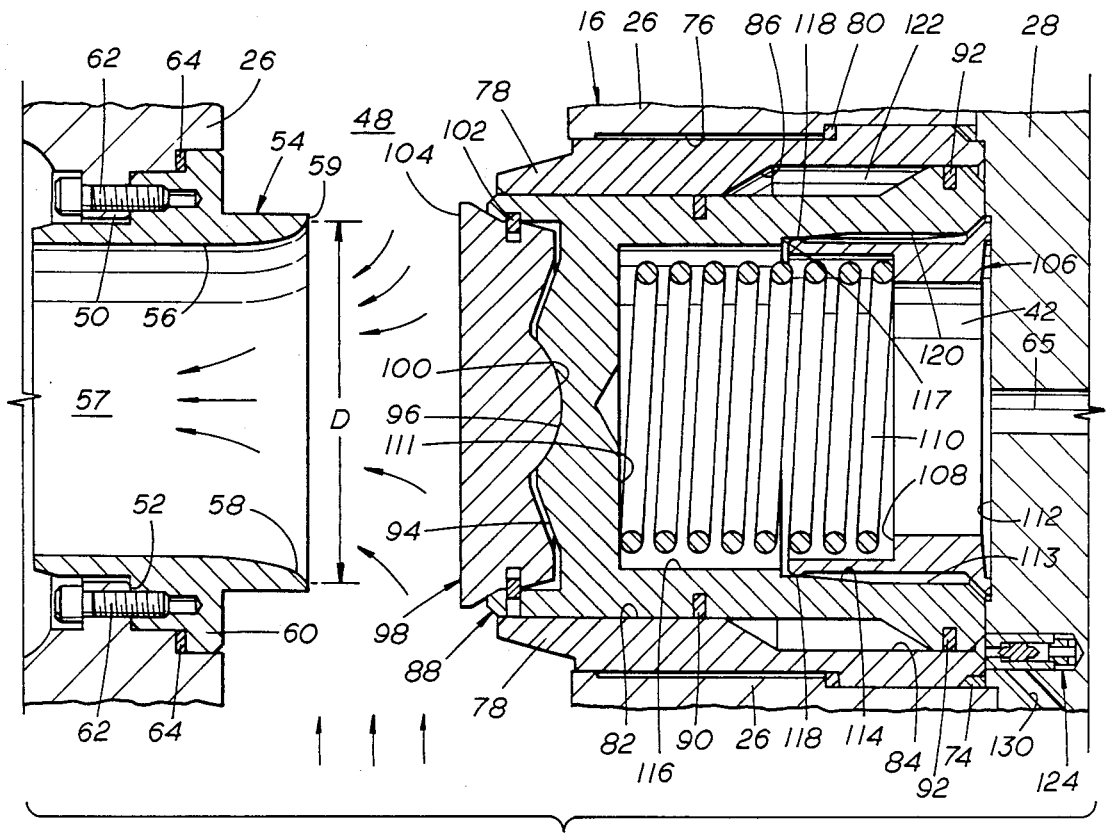
FIG. 5 is an enlarged fragment of FIG. 3 showing the main relief valve in opened position and being cushioned during movement from its seated position to opened position.

Piston 88 is cushioned by fluid metering both during movement to an open position from closed position, and during movement to a closed seated position from a fully opened position shown in FIG. 5. Referring particularly to FIGS. 4 and 5, piston 88 has an enlarged inner diameter shown at 113 which tapers at 114 to a normal diameter portion 116 at an annular shoulder 117. The inner end of cushioning sleeve 106 has an annular bead or protuberance 118 thereon. A fluid metering chamber shown at 120 in FIG. 5 is formed between the outer peripheral surface of sleeve 106 and the adjacent enlarged diameter surface 112 of piston 88. Thus, upon movement of piston 88 to an open position as shown in FIG. 5, the restricted flow passage between sleeve 106 and piston 88 results in a compression of the fluid in chamber 120 to effect cushioning of piston 88 during such movement.

During return movement to closed position from the open position of FIG. 5, a fluid metering chamber is shown at 122 between the outer circumference of piston 88 and enlarged bore portion 84 of sleeve 78. While metal ring 92 is designed to be a fluid tight seal, metal ring 90 is designed to permit a limited degree of fluid leakage from chamber 122 upon movement of piston 88 to seated position. Thus, upon movement of piston 88 from the position of FIG. 5 to the closed seated position of FIG. 4, fluid is metered from cushion chamber 122 by leakage past metal seal 90 thereby minimizing any slamming or impact action against seat 59. It is to be noted that leakage of fluid pass metal seals 90 and 92 does not affect the normal operation or functioning of the safety system since body chamber 48 is exposed to inlet fluid pressure from inlet fluid passage 45 at all times. If valve chamber 48 were exposed to outlet fluid pressure during normal operation as has been common heretofore, then such leakage could adversely affect the operation of the safety system since fluid pressure from the dome chamber could be reduced by fluid communication or leakage into the lower outlet pressure within the valve body chamber.

In order for valve member 88 to reseat on a predetermined blowdown, it is desirable that a cross sectional area of dome chamber 42 defined by diameter D2 be around twice the cross sectional area of valve seat 104 defined by diameter D. The cross sectional area defined by diameter D1 is intermediate the cross sectional areas defined by diameters D and D2.

It is highly desirable to cushion piston 88 during movement from closed position to open position, and from open position to closed position, since high opening and closing forces are obtained. The high opening force is obtained by the relatively large area defined by diameter D being exposed to high fluid inlet pressure after the initial cracking or opening of main valve 16 since only the annulus between the area defined by diameter D and the area defined by D1 is exposed to fluid pressure from inlet flow passage 45 in the seated closed position of valve 16. Likewise, since the area defined by diameter D2 is preferably around twice the area defined by diameter D, the closing force from blowdown is high. Thus, it is highly desirable that cushioning be provided in both directions of travel of piston 88. It is noted that leakage of fluid is only desired about small metal seal 90 during movement of piston 88 to closed position and large diameter seal 92 is not designed for leakage as it would be undesirable to have fluid flowing into dome chamber 42 from metering chamber 122 during the closing action since it could affect the fluid pressure from pilot valve 34 communicated through line 40. While the area defined by diameter D2 is preferably around twice the area defined by diameter D, it is to be understood that such areas may vary under various types of uses, and it is only necessary that the area defiend by diameter D2 be substantially greater than the area defined by diameter D.

Figure 6:
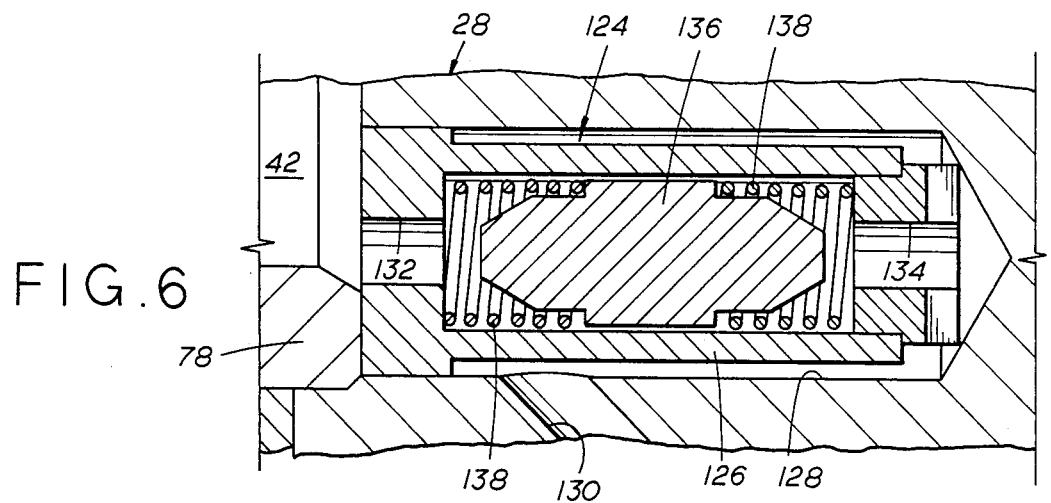
FIG. 6 is an enlarged sectional view of a drain valve including a shuttle member to permit drainage of fluid from the dome chamber.
Figure 7:
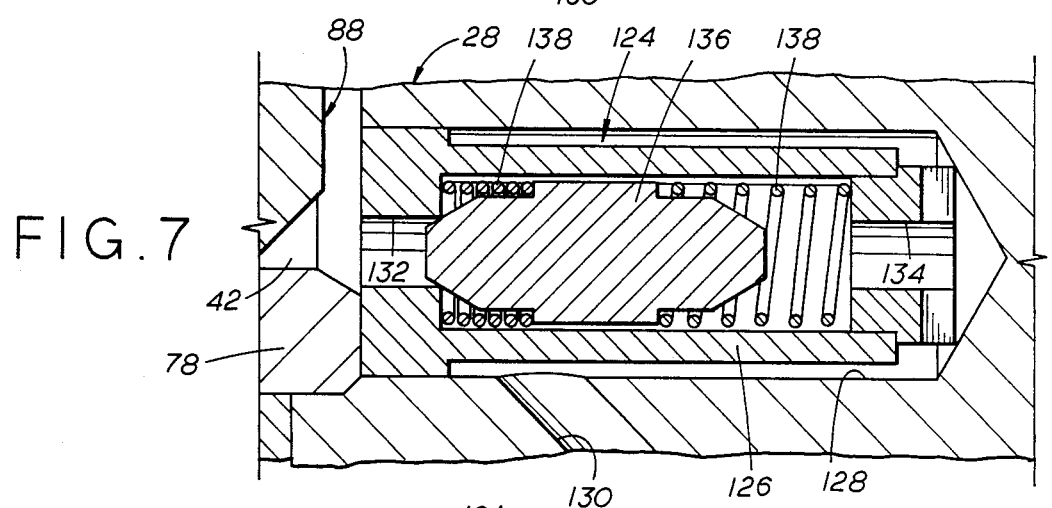
FIG. 7 is a sectional view of the drain plug valve shown in FIG. 6 but showing the shuttle valve member in a position blocking fluid flow between the inlet and dome chamber.

It is desirable, particularly when the safety relief system comprising the present invention is used with steam, that a drain be provided for dome chamber 42. For this purpose and referring particularly to FIG. 6 and 7, a shuttle valve is indicated generally at 124 and is positioned adjacent the lower side of dome chamber 42. A shuttle valve housing 126 is mounted within a bore 128 in cover 28. Bore 128 is in fluid communication with inlet port 66 through a lateral port 130. Housing 126 has end ports 132 and 134 with port 132 being in fluid communication with dome chamber 42 and port 134 being in fluid communication with bore 128. A shuttle valve member 136 is mounted loosely within housing 126 in a normal centered position between opposed springs 138 as shown in FIG. 6 and a limited leakage of fluid occurs past shuttle valve member 136 in its centered position. Thus, in the centered position shown in FIG. 6, fluid from dome chamber 42 would pass through port 132, past shuttle valve 136, and through ports 134 and 130 to inlet port 66. In the event of an increase in inlet fluid pressure a predetermined amount, shuttle valve member 136 moves to the position shown in FIG. 7 blocking port 132 thereby blocking fluid communication between dome chamber 42 and inlet port 66. In the event it is desired to test the blowdown pressure in chamber 42 through line 40, shuttle valve member 136 moves to a position to block fluid flow from end port 134 and from inlet port 66 thereby to permit the high test fluid pressure to be in fluid communication with chamber 42 under a normal fluid inlet pressure.

It is noted that elastomeric seals are employed at temperatures generally below around 350° F. as such seals may deteriorate at higher temperatures and not be effective seals. Thus, metal seals such as stainless steel seals or seals made of graphite are normally employed at temperatures above around 350° F. and may be utilized for steam, vapor, or liquids at pressure from 30 psi to 6,000 psi. Since metal or graphite seals are relatively hard, a minimum of drag or friction is exerted against the movement of the main valve member and thus, a relative fast acting safety valve system is provided.

Figure 8:
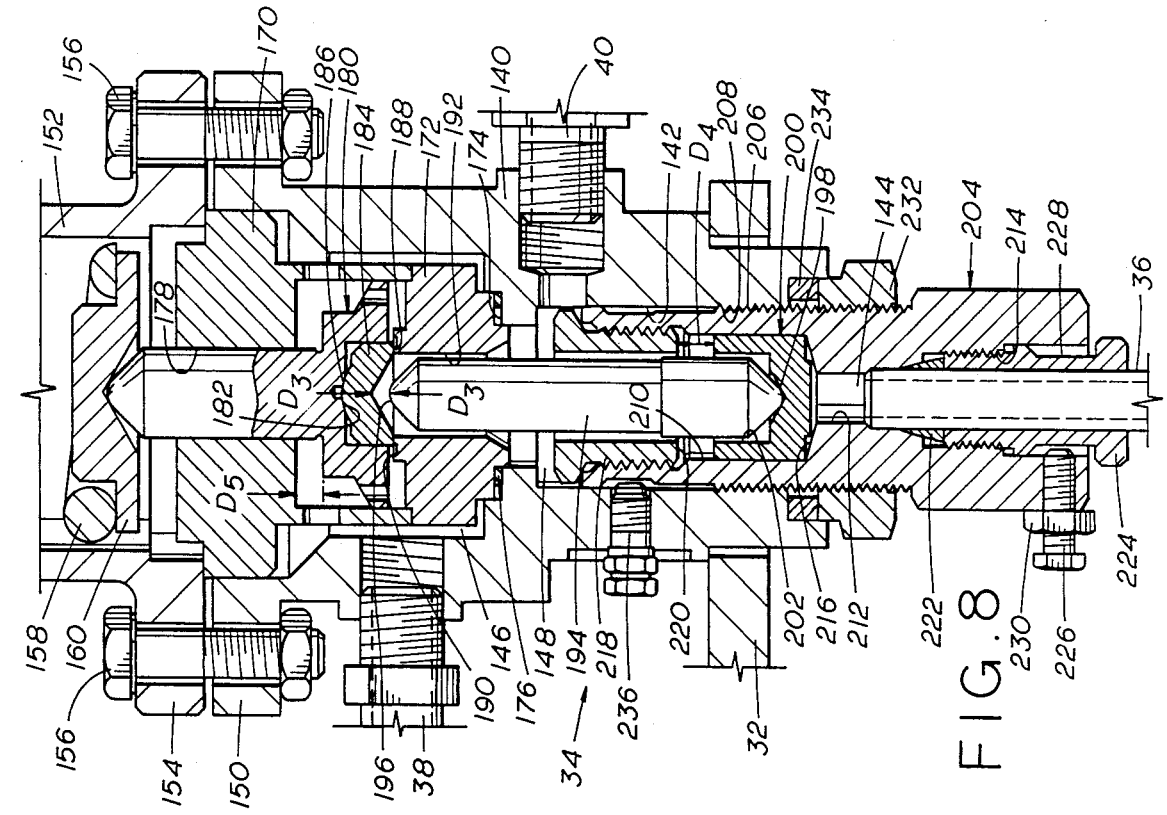
FIG. 8 is an enlarged sectional view of the pilot valve of this invention, certain parts being broken away, and illustrating the pilot valve in a normal operating position with fluid flow blocked between the inlet, outlet, and intermediate fluid chambers.
Figure 9:
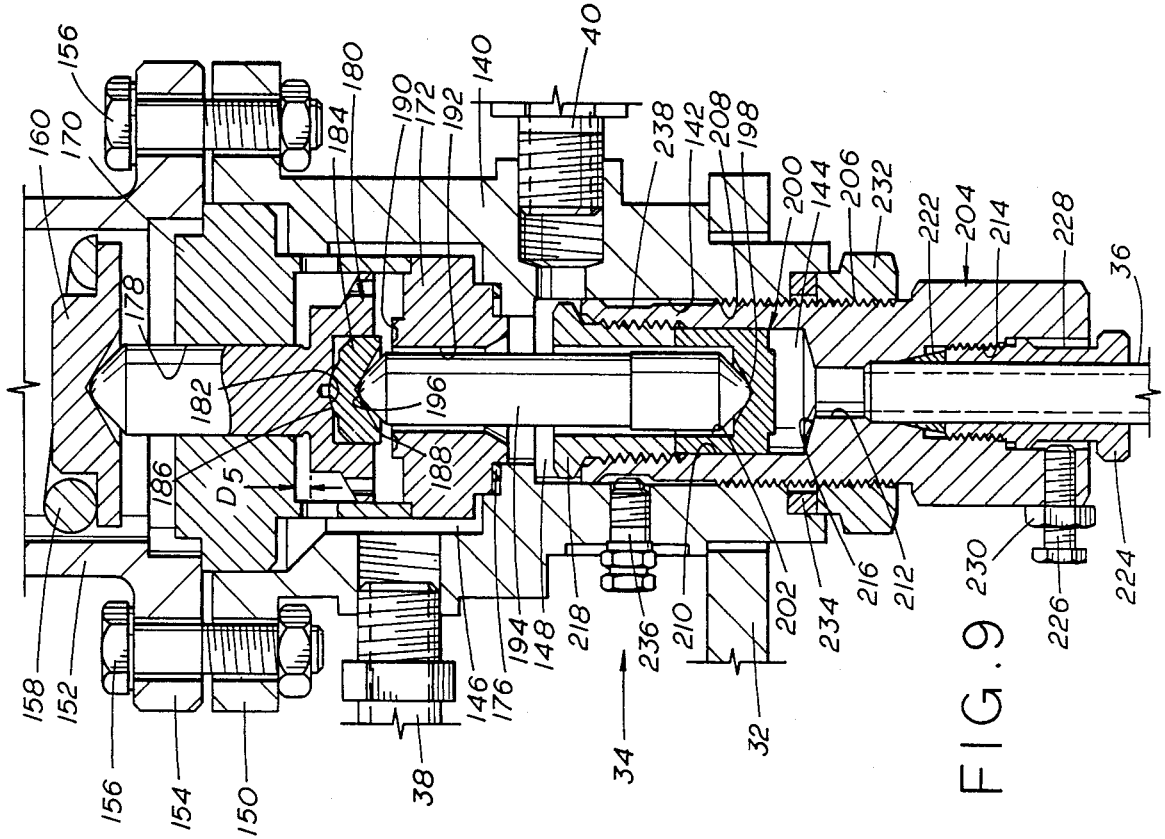
FIG. 9 is an enlarged sectional view of the pilot valve shown in FIG. 8 but showing the pilot valve in an actuated position under a predetermined high fluid pressure with the intermediate fluid chamber in fluid communication with the outlet chamber for reducing the fluid pressure in the dome chamber of the main relief valve.

Referring generally to FIGS. 2 and 3, and more particularly to FIGS. 8 and 9, high temperature pilot valve 34 utilized in the high temperature safety relief system comprising the present invention is illustrated. Pilot valve 34 is a so-called no-flow pilot valve which is non-flowing during normal operation. A non-flowing pilot valve does not have a continuous fluid flow during its normal operating or on position when the main control or relief valve 16 is in its normal closed position. While a very small amount of fluid may be transmitted through the pilot valve during operation, the amount is insignificant.

In addition, the responsiveness of a non-flowing pilot valve to pressure changes in a sensed fluid is relatively constant over its operating range as a non-flowing pilot valve is not as effected by orifice size as is a flowing pilot valve. Thus, non-flowing pilot valves have a faster response to pressure changes in the sensed fluid as compared to pilot valves having a continuous flow of fluid therethrough.

High temperature pilot valve 34 has a body 140 with a central bore 142 extending therethrough. Inlet line 36 is in fluid communication with an inlet chamber 144, outlet line 38 is in fluid communication with an outlet fluid chamber 146, and dome line 40 is in fluid communication with an intermediate fluid chamber 148 positioned between fluid inlet chamber 144 and fluid outlet chamber 146.

Body 140 has an upper flange 150 and a bonnet 152 having a lower flange 154 is bolted to flange 150 by bolts 156. A spring 158 fits within bonnet 152 between opposed upper and lower spring followers 160. Adjusting screw 162 is in engagement with upper spring follower 160 to adjust the compression of spring 158 and has a lock nut 164 thereon for securement in adjusted position. A cap 166 is threaded onto the upper end of bonnet 152 to form a cover for adjusting screw 162. A vent 168 carried by bonnet 152 vents the interior of bonnet 152.

A fixed guide indicated generally at 170 abuts a nozzle member generally indicated 172 which is urged into sealing relation with an internal annular shoulder 174 and metal seal 176 thereon by flange 154 on bonnet 152. Flange 154 abuts guide 170 which urges nozzle member 172 into tight sealing contact with seal 176 upon tightening of bolts 156. Guide 170 has a central bore 178 receiving a spindle generally indicated at 180 for longitudinal movement therein. The upper end of spindle 180 engages lower spring follower 160 and is urged downwardly by spring 158 and follower 160. Spindle 180 has a lower recess therein defining a central spherical surface shown at 182 and receiving a disc seal member 184 therein. Disc seal member 184 has a complementary upper spherical surface 186 which engages spherical surface 182. A lower annular seat 188 is formed on the lower end of disc seal member 184 and engages a matching fixed seat 190 on lower nozzle member 172. Spherical surfaces 182 and 186 permit disc seal member 184 to seat tightly in fluid tight relation on fixed seat 190.

Nozzle member 172 has a central nozzle port 192 therethrough and a spacer rod shown at 194 is mounted in spaced relation to nozzle port 192 to provide an annular flow passageway therebetween. The upper end 196 of rod 194 is spaced a distance D3 from the adjacent end of seat member 184 in normal static position shown in FIG. 8. Upper end 196 is adapted to contact seat member 184 in bearing relation upon an increase in fluid inlet pressure a predetermined amount as will be explained. The other opposed lower end 198 of spacer rod 194 is in continuous bearing contact with a piston seat member indicated generally at 200. Piston member 200 has a recess 202 receiving the lower end portion of rod 194.

For adjusting the blowdown pressure, an elongate internal housing generally indicated at 204 is externally threaded at 206 and is threaded within the internally threaded bore portion 208 of bore 142 of body 140. Internal housing 204 has an upper enlarged bore portion 210, a small diameter intermediate bore portion 212, and a lower outer bore portion 214 of an enlarged diameter. Piston member 200 is received within upper enlarged bore portion 210 and is seated in the normal operation of pilot valve 34 in metal-to-metal sealing relation on tapered seat 216 of internal housing 204. An externally threaded seat member 218 is threaded within the enlarged bore portion 210 of internal housing 204 and has a lower end 220 which defines a lower annular seat normally spaced a distance D4 from the upper annular end of piston 200. The upper end of piston 200 is adapted to contact seat 220 in metal-to-metal sealing relation upon the reaching of a predetermined high fluid pressure in inlet chamber 144 as shown in FIG. 9.

For mounting inlet line 36 within enlarged end bore portion 214 of housing 204, a metal ferrule 222 is fitted around inlet line 36. An externally threaded thrust bushing 224 is threaded within enlarged bore portion 214 against metal ferrule 222 to provide a tight fit. A set screw 226 has its inner end received within an annular groove 228 in bushing 224 and a lock nut 230 is tightened at a predetermined projection of set screw 226 within groove 228 but without the inner end of adjusting screw 226 contacting bushing 228 and yet preventing removal of bushing 224.

To secure internal housing 204 at a predetermined position, a securing nut 232 is threaded about an outer threaded circumference of housing 204 and engages a metal seal 234 in sealing relation. Also, to prevent the removal of housing 204, a set screw 236 is received within an annular groove 238 about housing 204 to block the removal of housing 204 from bore 142.

It is noted that the spacing between spindle 180 and fixed guide 170 is shown at D5 in FIGS. 8 and 9. Distance D4 which is the spacing between piston 200 and seat 218 is greater than spacing D3 between upper end 196 of spacer rod 194 and disc seat 184 on spindle 180 but less than the total of distances D3 and D5 so that spindle 180 does not contact or bottom out on guide 170 upon the actuation of pilot valve 34 as shown in FIG. 9.

The blowdown pressure is adjusted depending on the type of action desired in the piston or piston valve member. For example, in the event it is desired for the piston to have a modulating action, the blowdown will be zero so that piston 88 acts similarly to a back pressure regulator valve. Normally a pop action pilot valve is set with around a five percent (5%) blowdown. When the predetermined high set pressure is reached which is determined primarily by adjustment of adjusting screw 162, pilot valve 34 opens to depressurize dome chamber 42 thereby reducing the load on the outer end or the top of piston 88 so that the spring tension from spring 110 is overcome to open the main valve. When the predetermined blowdown pressure is reached, pilot valve 34 closes and the system pressure is then diverted to the dome chamber with piston 88 then moving to a closed position.

To adjust the blowdown pressure or force, the spacing or distance D3 is varied by adjustment of internal housing 204. An increase in the distance or spacing D3 results in a smaller blowdown pressure whereas a decrease in spacing D3 results in an increased blowdown pressure or force since the distance D4 remains constant. For such adjustment bushing 224 is first loosened to permit rotation of internal housing 204 relative to fluid inlet line 36. Then, adjusting screw 232 is loosened to permit housing 204 to be adjusted inwardly or outwardly of bore 132 and body 140. Upon the predetermined positioning of internal housing 204 to obtain the desired spacing at D3, adjusting nut 232 is tightened. Then, bushing 224 is tightened to secure inlet line 36.

In operation, an increase in fluid inlet pressure from pressure vessel 14 results in an increase in fluid pressure in fluid inlet chamber 144 of pilot valve 34 to unseat piston 200 and permit fluid pressure to flow past piston 200 for initially unseating spindle 180 and seat member 184. Further movement of piston 200 results in movement of spacer rod 194 which contacts seat member 184 and maintains seat member 184 in unseated position as long as piston 200 is seated against seat 220 as shown in FIG. 9 thereby providing fluid communication between outlet fluid chamber 146 and intermediate fluid chamber 148 to reduce the fluid pressure in dome chamber 42. Fluid pressure in chamber 48 is exerted against the annular area of piston 88 defined between the area defined by diameter D1 for piston 88 and the area defined by diameter D for fixed seat 64 to unseat piston 88. Inlet fluid pressure is then exerted against the entire face of piston 88 to move piston 88 at a high force and speed to open position. The outer movement of piston 88 to the open position shown in FIG. 3 results in the metering of fluid from chamber 120 between cushioning sleeve 106 and the enlarged diameter inner surface 112 thereby cushioning the movement of piston 88 to its full open position.

Upon a subsequent decrease in the fluid pressure in inlet flow passage 45 to a predetermined level, fluid pressure in inlet chamber 144 is reduced and spring 158 in pilot valve 34 reseats spindle 180 on nozzle 172 thereby blocking fluid communication between intermediate fluid chamber 148 and fluid outlet chamber 146. Likewise, intermediate fluid chamber 148 is in fluid communication with fluid inlet chamber 144 during movement of piston 200 to seated position which results in an increase in fluid pressure in dome line 40 and dome chamber 42. The blowdown pressure in dome chamber 42 in combination with the bias of spring 110 moves piston 88 to a seated position shown in FIG. 3. The movement of piston 88 to seated closed position is cushioned by the metering of fluid from metering chamber 122 which leaks past the small diameter metal ring 90 and thereby minimizes the slamming action against seat 64.

Figure 10:
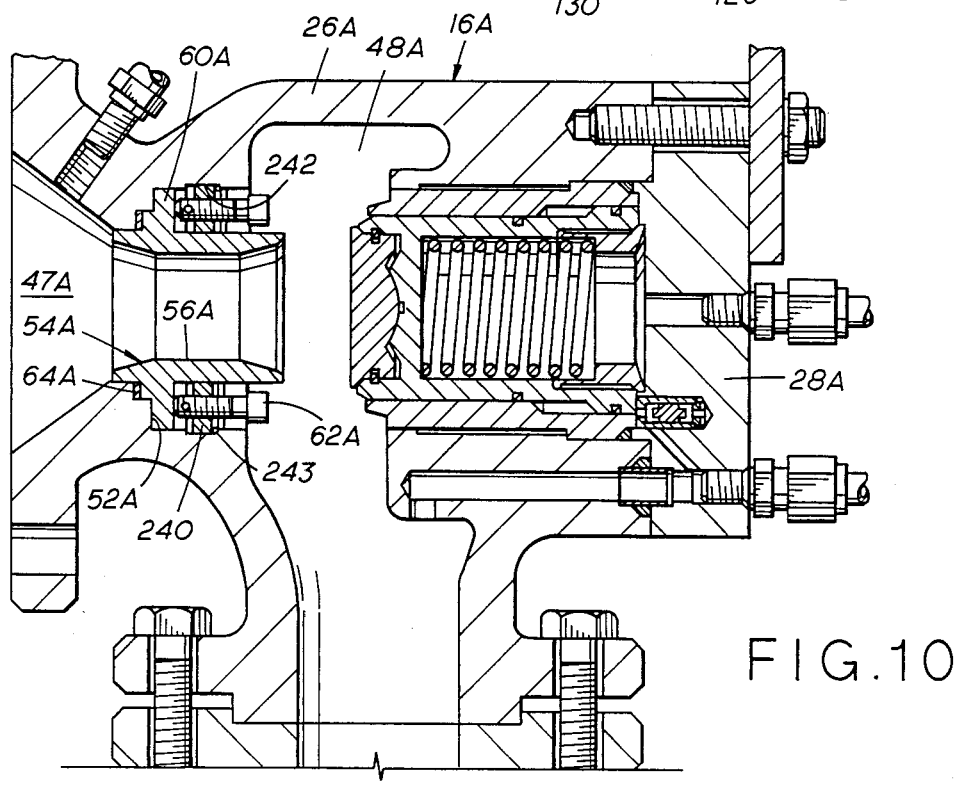
FIG. 10 is a sectional view of a modification of the main relief valve illustrating a modified seat for the main valve member which has the mounting means interiorly of the main valve body.

Referring to FIG. 10, a modified nozzle member 54A is illustrated which may be positioned within outlet flow passage 47A of main relief valve 16A through main body chamber 48A and body 26A upon removal of cover 28A. Flange 60A of nozzle member 54A is positioned in abutting relation with annular shoulder 52A of body 26A. A retainer ring 240 fits about nozzle member 54A and has an outer peripheral portion received within an annular groove 242 in body 26A. A small diameter wire member 243 is positioned within groove 242 adjacent retainer ring 240. Securing screws 62A extend through threaded openings in retainer ring 240 and upon tightening urge retainer ring 240 against wire member 243 with inner ends thereof engaging flange 60A to urge nozzle member 54A against shoulder 52A. A high temperature seal 64A provides a seal between flange 60A and body 26A. The remainder of relief valve 16A is identical to that shown in the embodiment of FIGS. 1–9.

While preferred embodiments of the present invention have been illustrated in detail, it is apparent that modifications and adaptations of the preferred embodiments will incur to those skilled in the art. However, it is to be expressly understood that such modifications and adaptations are within the spirit and scope of the present invention as set forth in the following claims.

What is claimed is:

1. A high temperature safety relief valve comprising:
   a valve body defining a main valve chamber and including an inlet flow passage and an outlet flow passage arranged at right angles to each other and communicating with the main valve chamber;
   a piston valve member mounted in said main valve chamber for reciprocal movement along the longitudinal axis for the outlet flow passage and at right angles to the longitudinal axis of the inlet flow passage;
   an outer sleeve mounted in fixed relation within said body chamber and receiving said piston valve member therein for reciprocal movement;
   a high temperature seal mounted between said piston valve member and said sleeve;
   a fixed nozzle member mounted in the outlet flow passage and defining an annular seat on which the inner end of said piston valve member seats in closed position to block fluid flow between said inlet flow passage and said outlet flow passage, the annular area of the piston valve member radially outwardly of the annular nozzle seat being exposed to fluid inlet pressure in the body chamber in the closed position of the piston valve member;
   a dome chamber in the valve body adjacent the outer end of said piston valve member and adapted to be in fluid communication with a pilot valve for controlling the opening and closing of said piston valve member; and
   fluid cushioning means associated with the dome chamber to provide fluid cushioning of the piston valve member during return movement of the piston valve member to seated position on said nozzle member after being openeed at a predetermined high fluid pressure, said fluid cushioning means including a fluid metering chamber including fluid flow restriction means for metering fluid from said fluid chamber pressurized during the return movement of the piston valve member thereby to provide said fluid cushioning.

2. In a high temperature safety relief system for a pressure vessel having a flow line connected to the pressure vessel and particularly adapted for use at temperatures over around 350° F.;

an improved pilot operated high temperature pressure relief valve in the flowline adapted to open under a predetermined positive fluid pressure within the pressure vessel to permit a flow of fluid from the pressure vessel; said improved pressure relief valve comprising:

a valve body having a main body chamber, and an inlet flow passage and an outlet flow passage communicating with the body chamber having longitudinal axes generally at right angles to each other;

a piston mounted for reciprocal movement within said valve body generally along the longitudinal axis of said outlet flow passage;

a nozzle member in the outlet flow passage defining an annular valve seat positioned adjacent said piston and defining an outlet port for the outlet flow passage;

means urging an inner end of said piston into seated closed position on said valve seat to block fluid flow between said inlet flow passage and said outlet flow passage during normal operation, the inner seated end of said piston being exposed in a closed position to the outlet port and being of a diameter greater than the diameter of the outlet port to define an outer annular area radially outwardly of the annular valve seat exposed in a closed position to fluid pressure from the inlet flow passage within the valve body chamber;

a generally cylindrical sleeve mounted within the valve body in fixed position and receiving the piston for reciprocal back and forth movement;

spring means urging said piston into seated closed position on said valve seat;

a dome chamber adjacent the outer end of said piston adapted to be in fluid communication with an associated pilot valve, the effective fluid pressure area of said piston exposed to fluid pressure from said dome chamber being around twice the effective fluid pressure area of the inner end of the piston exposed to fluid outlet pressure from the outlet flow passage in the seated closed position of the piston;

said cylindrical sleeve having an enlarged diameter portion thereof adjacent the outer end of said piston receiving a complementary enlarged diameter portion of said piston, said enlarged diameter portion of said cylinder defining a fluid cushion chamber in the open position of said piston; and an expandable piston ring mounted about said piston and a separate expandable piston ring mounted about the enlarged diameter piston portion, the fluid in said fluid cushion chamber upon movement of said piston toward a seated position being metered from said cushion chamber in a metering action to cushion the movement of the piston to return seated position to minimize impact of the piston against said seat.

3. In the high temperature safety relief system set forth in claim 2 wherein said piston has a body with a central recess at its inner end, and a separate valve seat carried by said piston is received within said recess.

4. In the high temperature he safety relief system set forth in claim 3 wherein said valve seat has a spherical head thereon received within a complementary spherical recess in the piston body and is adapted to pivot relative to said piston body for seating firmly on said nozzle member.

5. In the high temperature safety relief system as set forth in claim 3 wherein said nozzle member has an outwardly extending annular flange therearound and said body has an inwardly extending axially aligned flange in abutting relation;

said body having an internal annular groove adjacent said flanges spaced laterally from said nozzle member, a retainer ring about said nozzle having an outer peripheral portion extending within said annular groove and having a plurality of internally threaded openings extending through said rings, and externally threaded securing bolts are threaded within said openings having their inner ends in abutting relation to said flange on said nozzle, said bolts upon being tightened urging said ring against adjacent surfaces defining said groove and urging said flanges into abutting engagement with said body for securing the nozzle member.

6. In the high temperature safety relief system as set forth in claim 3 wherein said body has an inwardly extending flange withing said outlet flow passage and said nozzle member has an axially aligned outwardly extending flange; and securing means extend through aligned openings in said flanges for drawing said flanges together in abutting relation and securing said nozzle member in tight fitting relation against the flange on said body.

7. A high temperature safety relief valve comprising:

a valve body defining a main valve chamber and including an inlet flow passage and an outlet flow passage arranged at right angles to each other and communicating with the main valve chamber;

a piston valve member mounted in said main valve chamber for reciprocal movement along the longitudinal axis for the outlet flow passage and at right angles to the longitudinal axis of the inlet flow passage;

a sleeve mounted in fixed relation within said body chamber and receiving said piston valve member therein for reciprocal movement;

a pair of longitudinally spaced high temperature seals mounted between said piston valve member and said sleeve, the seal adjacent the body chamber being designed to permit a limited fluid leakage therearound;

a fixed nozzle member mounted in the outlet flow passage and defining an annular seat on which the inner end of said piston valve member seats in closed position to block fluid flow between said inlet flow passage and said outlet flow passage, the annular area of the piston valve member radially outwardly of the annular nozzle seat being exposed to fluid inlet pressure in the body chamber in the closed position of the piston valve member;

a dome chamber in the valve body adjacent the outer end of said piston valve member and adapted to be in fluid communication with a pilot valve for controlling the opening and closing of said piston valve member;

and fluid cushioning means associated with the dome chamber to provide fluid cushioning of the piston valve member during return movement of the piston valve member to seated position on said nozzle member after being opened at a predetermined high fluid pressure.

8. A high temperature safety relief valve as set forth in claim 7 wherein;

said piston valve member has an enlarged diameter outer end portion and said sleeve has an enlarged diameter inner bore portion receiving said enlarged diameter portion of said piston valve member;

the movement of said piston valve member to a fully opened position relative to said fixed sleeve forming a fluid metering chamber in the annular volume defined by the enlarged diameter inner bore portion of said sleeve whereby upon return movement of said valve member to a seated position, fluid is metered from said cushioning chamber past the seal adjacent the valve chamber for cushioning such movement.

9. A high temperature safety relief valve comprising:

a valve body defining a main valve chamber and including a inlet flow passage and an outlet flow passage arranged at right angles to each other and communicating with the main valve chamber;

a piston valve member mounted in said main valve chamber for reciprocal movement along the longitudinal axis for the outlet flow passage and at right angles to the longitudinal axis of the inlet flow passage;

a fixed nozzle member mounted in the outlet flow passage and defining an annular seat on which the inner end of said piston valve member seats in closed position to block fluid flow between said inlet flow passage and said outlet flow passage, the annular area of the piston valve member radially outwardly of the annular nozzle seat being exposed to fluid inlet pressure in the body chamber in the closed position of the piston valve member;

a dome chamber in the valve body adjacent the outer end of said piston valve member and adapted to be in fluid communication with a pilot valve for controlling the opening and closing of said piston valve member;

fluid cushioning means associated with the dome chamber to provide fluid cushioning of the piston valve member during return movement of the piston valve member to seated position on said nozzle member after being opened at a predetermined high fluid pressure;

an end cover mounted on the valve body to permit access to the valve chamber and forming an outer end of the dome chamber; and additional fluid cushioning means associated with the dome chamber and piston valve member to provide fluid cushioning of the piston valve member during movement of the piston valve member to open position from closed seated position on the nozzle member, said additional fluid cushioning means comprising:

an end cushioning sleeve mounted within the dome chamber, and a spring in the dome chamber biased between the piston valve member and said end sleeve to urge said end sleeve outwardly against the end cover;

said additional fluid cushioning means during the opening movement of said piston valve member including a fluid metering chamber formed between said outer sleeve and piston valve member to provide fluid cushioning upon outward movement of said piston valve member toward said end sleeve and said end cover.

10. The high temperature safety relief valve as set forth in claim 1 wherein said fluid flow restriction means comprises a second seal spaced longitudinally from said first mentioned seal and mounted adjacent said valve chamber between said piston valve member and said outer sleeve with said fluid metering chamber being defined between said spaced seals, said second seal forming said fluid flow restriction means and permitting fluid leakage from said metering chamber upon return movement of said piston valve member.

11. A high temperature safety relief valve comprising:

a valve body defining a main valve chamber and including an inlet flow passage and an outlet flow passage arranged at right angles to each other and communicating with the main valve chamber;

a piston valve member mounted in said main valve chamber for reciprocal movement along the longitudinal axis for the outlet flow passage and at right angles to the longitudinal axis of the inlet flow passage;

an outer sleeve mounted in fixed relation within said body chamber and receiving said piston valve member therein for reciprocal movement;

a high temperature seal mounted between said piston valve member and said sleeve;

a nozzle member in the outlet flow passage and defining an annular seat on which the inner end of said piston valve member seats in closed position to block fluid flow between said inlet flow passage and said outlet flow passage, the annular area of the piston valve member radially outwardly of the annular nozzle seat being exposed to fluid inlet pressure in the body chamber in the closed position of the piston valve member;

a dome chamber in the valve body adjacent the outer end of said piston valve member;

an end cover mounted on the valve body to permit access to the valve chamber and defining the outer end of the dome chamber; and fluid cushioning means associated with the dome chamber and piston valve member to provide fluid cushioning of the piston valve member during movement of the piston valve member to open position from closed seated position on the nozzle member, said fluid cushioning means including an inner cushioning sleeve mounted in the dome chamber in concentric relation to said outer sleeve to receive said piston valve member therebetween and defining a fluid metering chamber between said sleeves adjacent the outer end of said piston valve member, and fluid flow restriction means associated with said fluid metering chamber to provide metering of pressurized fluid from said metering chamber upon opening movement of said piston valve member from closed position whereby fluid flow from said metering chamber is restricted by said fluid flow restriction means for cushioning the outward movement of said piston valve member toward said end cover.

12. A high temperature safety relief valve as set forth in claim 11 wherein said fluid flow restriction means is provided between the inner circumference of said piston valve member and the outer circumference of said inner sleeve, said fluid flow restriction means including a metering opening gradually reduced in size during the opening movement of said piston valve member.

13. A high temperature safety relief valve comprising:
- a valve body defining a main valve chamber and including an inlet flow passage and an outlet flow passage arranged at right angles to each other and communicating with the main valve chamber;
- a piston valve member mounted in said main valve chamber for reciprocal movement along the longitudinal axis for the outlet flow passage and at right angles to the longitudinal axis of the inlet flow passage;
- an outer sleeve mounted in fixed relation within said body chamber and receiving said piston valve member therein for reciprocal movement;
- a high temperature seal mounted between said piston valve member and said sleeve;
- a nozzle member in the outlet flow passage and defining an annular seat on which the inner end of said piston valve member seats in closed position to block fluid flow between said inlet flow passage and said outlet flow passage, the annular area of the piston valve member radially outwardly of the annular nozzle seat being exposed to fluid inlet pressure in the body chamber in the closed position of the piston valve member;
- a dome chamber in the valve body adjacent the outer end of said piston valve member;
- an end cover mounted on the valve body to permit access to the valve chamber and defining the outer end of the dome chamber;
- fluid cushioning means associated with the dome chamber to provide fluid cushioning of the piston valve member during return movement of the piston valve member to seated position said nozzle member after being opened at a predetermined high fluid pressure, said fluid cushioning means including a fluid metering chamber including fluid flow restriction means for metering fluid from said fluid chamber pressurized during the return movement of the piston valve member thereby to provide said fluid cushioning;
- additional fluid cushioning means associated with the dome chamber and piston valve member to provide fluid cushioning of the piston valve member during movement of the piston valve member to open position from closed seated position on the nozzle member, said additional fluid cushioning means including a separate fluid metering chamber formed adjacent the outer end of said piston valve member with fluid therein being pressurized upon the movement of said piston valve member toward an open position; and
- additional fluid flow restriction means associated with said separate fluid metering chamber for restricting the flow of pressurized fluid from said separate fluid metering chamber for cushioning the opening movement of said piston valve member toward said end cover.

* * * * *